US010330188B2

(12) United States Patent
Koch et al.

(10) Patent No.: US 10,330,188 B2
(45) Date of Patent: Jun. 25, 2019

(54) GEAR FOR A GEAR TRAIN

(71) Applicants:Schaeffler Technologies AG & Co. KG, Herzogenaurach (DE); Dr. Ing. H.C.F. Porsche Aktiengesellschaft, Stuttgart (DE)

(72) Inventors: Thorsten Koch, Schwieberdingen (DE); Markus Holzberger, Emskirchen (DE); Ramon Jurjanz, Erlangen (DE); Mario Arnold, Aurachtal (DE); Silvia Kutzberger, Erlangen (DE); Dustin Knetsch, Erlangen (DE); Wilfried Breton, Altdorf (DE); Igor Illg, Renningen (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 75 days.

(21) Appl. No.: 15/562,007

(22) PCT Filed: Feb. 18, 2016

(86) PCT No.: PCT/DE2016/200097
§ 371 (c)(1),
(2) Date: Sep. 27, 2017

(87) PCT Pub. No.: WO2016/155715
PCT Pub. Date: Oct. 6, 2016

(65) Prior Publication Data
US 2018/0087645 A1    Mar. 29, 2018

(30) Foreign Application Priority Data
Apr. 2, 2015 (DE) .......................... 10 2015 206 063

(51) Int. Cl.
| | | |
|---|---|---|
| *F16H 1/28* | (2006.01) | |
| *F16H 55/18* | (2006.01) | |
| *B60G 21/055* | (2006.01) | |

(52) U.S. Cl.
CPC .......... *F16H 55/18* (2013.01); *B60G 21/0555* (2013.01); *B60G 2202/42* (2013.01);
(Continued)

(58) Field of Classification Search
CPC ... F16H 55/18; F16H 1/2836; B60G 21/0555; B60G 2204/4191; B60G 2204/419; B60G 2202/42
See application file for complete search history.

(56) References Cited

U.S. PATENT DOCUMENTS 4,640,147 A * 2/1987 Yasukawa ............... F16H 55/18
74/409
4,745,823 A    5/1988 Morita
(Continued)

FOREIGN PATENT DOCUMENTS

DE    1840252 U    10/1961
DE    20104777 U1    10/2001
(Continued)

*Primary Examiner* — Drew J Brown
(74) *Attorney, Agent, or Firm* — Reid A. Baldwin

(57) ABSTRACT

Gears, for example, for a gear train are disclosed. The gear may be divided into two axially adjacent spur gears and have a torsion spring in the form of a circular ring segment. Between two peripherally mutually opposing spring ends, a slot may be formed in which two cams engage which are each assigned to one of the two spur gears. One of the cams may be assigned to one of the two spring ends and the other cam may be assigned to the other spring end. The two cams may be arranged at least substantially overlap-free in an axial direction, wherein contact faces for the cams formed at both spring ends of the torsion spring are arranged on a
(Continued)

radially outer end of the spring ends. The contact faces may be delimited radially inwardly by clearances on the spring ends.

16 Claims, 5 Drawing Sheets

(52) U.S. Cl.
CPC .................. *B60G 2204/419* (2013.01); *B60G 2204/4191* (2013.01); *F16H 1/2836* (2013.01)

(56) References Cited

U.S. PATENT DOCUMENTS

| | | | | |
|---|---|---|---|---|
| 8,621,951 | B2* | 1/2014 | Meier | F16D 1/116 |
| | | | | 74/409 |
| 2002/0128098 | A1* | 9/2002 | Mott | F16H 55/30 |
| | | | | 474/94 |
| 2010/0242649 | A1* | 9/2010 | Vandewal | F16H 55/18 |
| | | | | 74/409 |
| 2013/0145878 | A1* | 6/2013 | Kim | C22C 33/0264 |
| | | | | 74/445 |
| 2014/0360300 | A1* | 12/2014 | Viechtbauer | F16H 55/18 |
| | | | | 74/445 |
| 2015/0151604 | A1* | 6/2015 | Park | F16H 1/28 |
| | | | | 280/124.106 |
| 2015/0198205 | A1* | 7/2015 | Van Lieshout | F16D 3/10 |
| | | | | 74/445 |
| 2015/0316135 | A1* | 11/2015 | Schnolzer | F16H 55/18 |
| | | | | 74/440 |
| 2015/0354669 | A1* | 12/2015 | Ekoz | B60G 21/0555 |
| | | | | 475/331 |
| 2018/0086172 | A1* | 3/2018 | Breton | B60G 21/0555 |
| 2018/0087602 | A1* | 3/2018 | Koch | B60G 21/0555 |

FOREIGN PATENT DOCUMENTS

| | | |
|---|---|---|
| DE | 102012211725 A1 | 6/2013 |
| WO | 03056141 A1 | 7/2003 |

* cited by examiner

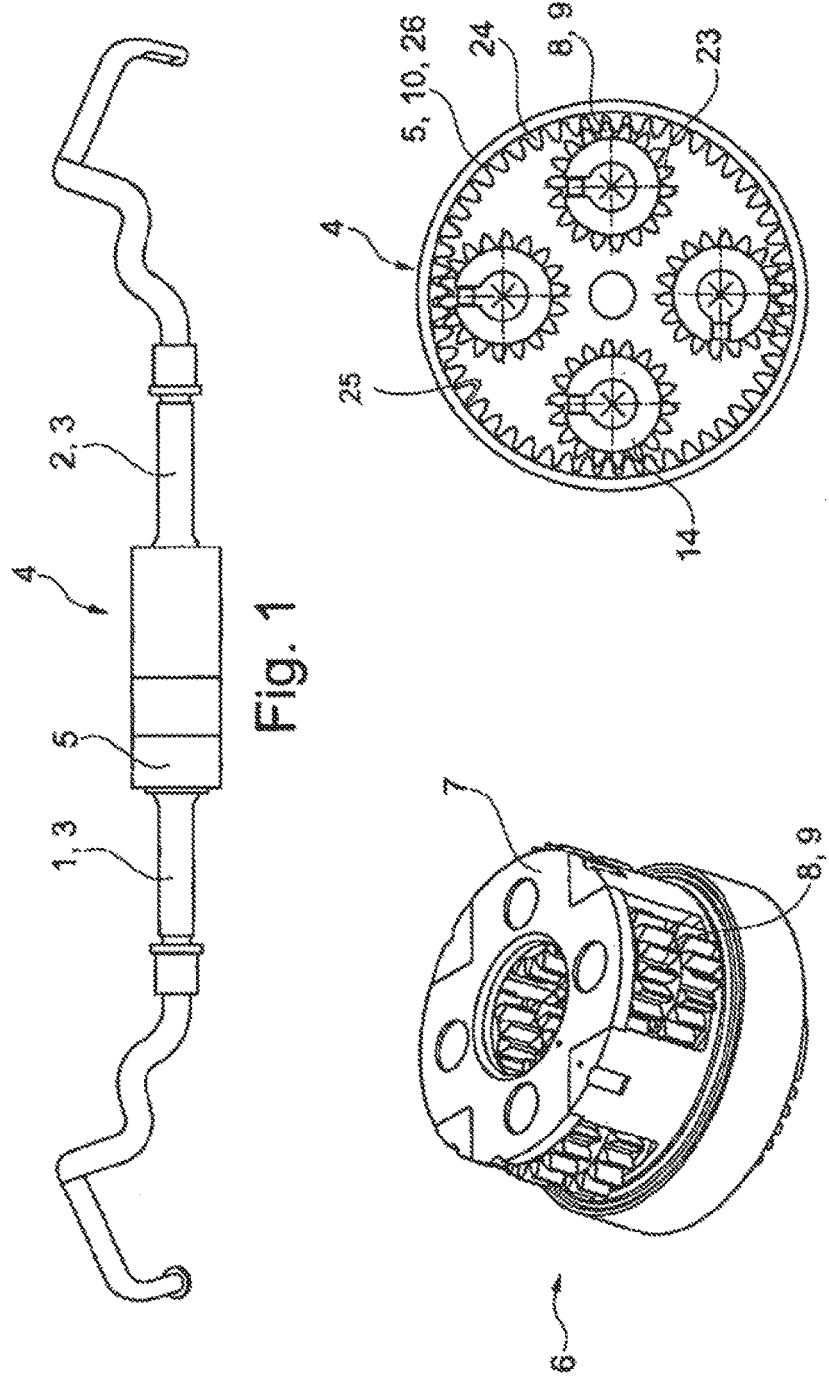

GEAR FOR A GEAR TRAIN

CROSS-REFERENCE TO RELATED APPLICATIONS

This application is the U.S. National Phase of PCT Appln. No. PCT/DE2016/200097 filed Feb. 18, 2016, which claims priority to DE 102015206063.2 filed Apr. 2, 2015, the entire disclosures of which are incorporated by reference herein.

TECHNICAL FIELD

The present disclosure concerns a gear for a gear train, such as for a planetary gear mechanism.

BACKGROUND

WO03/056141A1 describes a gear. The gear, divided into two axially adjacent spur gears, has a torsion spring in the form of a circular ring segment, wherein a slot is formed between the two peripherally mutually opposing spring ends, in which slot two cams engage which are each assigned to one of the two spur gears, wherein one of the cams is assigned to one of the two spring ends and the other cam is assigned to the other spring end. When the gear is mounted in the gear mechanism, the two spur gears mesh play-free with the engaged gear. In the installed rotational position of the two spur gears, the cams arranged peripherally behind each other are offset to each other in the peripheral direction, such that the cams push the spring ends of the torsion spring apart, enlarging the slot. The pretension and stiffness of the torsion spring are essential for smooth operation of such a gear mechanism. If a large pretension and large stiffness are required, a correspondingly large torsion spring must be provided and pretensioned. In many applications, the installation space available for the torsion spring is very limited, so enlargement is only possible within limits.

SUMMARY

An object of the present disclosure is to improve the pretension of the gear.

This object may be achieved with the gear according to the disclosure and Figures.

The gear according to the disclosure for a gear train, such as for a planetary gear mechanism, may be divided into two axially adjacent spur gears. This gear is for example configured as a planet wheel for a planetary gear mechanism. The teeth of the two spur gears may mesh with a mating gear, for example with a ring gear of said planetary gear mechanism: a respective tooth of the two spur gears engages in a common tooth gap of the mating gear, wherein the one tooth of the one spur gear can lie play-free on the tooth of the mating gear delimiting the tooth gap, and the other tooth of the other spur gear can lie play-free on the other tooth of the mating gear delimiting the tooth gap.

Furthermore, according to the disclosure, a torsion spring in the form of a circular ring segment may be provided, wherein between the two peripherally mutually opposing spring ends, a slot is formed in which two cams engage which are each assigned to one of the two spur gears, wherein one of the cams is assigned to one of the two spring ends and the other cam is assigned to the other of the two spring ends.

Because, according to the disclosure, the two cams may be arranged at least substantially without overlap in the axial direction, the advantages presented below may be achieved. When the torsion spring is not under stress and the slot is therefore at its smallest, the two cams can be arranged axially behind each other because of the at least substantially overlap-free arrangement in the axial direction, and engage in the slot of the stress-free torsion spring. The smaller the slot, the stiffer the torsion spring may be. A further advantage may be that a radial drifting of the torsion spring under load is reduced. The smaller the slot, the lower the tendency of the torsion spring to drift radially. In other words, the disclosure may allow as small as possible an opening angle between the two spring ends delimiting the slot.

In contrast, with the known pretensioned gears, the cams overlap axially and the two cams are arranged peripherally behind each other. This successive arrangement consequently requires a large slot when the torsion spring is not under tension, so that the torsion spring can be mounted stress-free between the two spur gears.

If now the two spur gears are twisted relative to each other, the two cams press the spring ends apart, enlarging the slot. Because of the smaller slot with the arrangement according to the disclosure, torsion springs of the same size can have a better stiffness than with the known arrangement.

The term "substantially overlap-free" in the sense of the disclosure means for example that the two cams may have a step or stop at their mutually facing free ends which intermesh axially. These steps may be composed such that in one direction of rotation of the two spur gears, the steps meet each other with form-fit so that twisting in this direction is not possible. In this contact position, the two cams may be arranged lying perfectly axially behind each other, e.g., aligned with each other. In the opposite direction of rotation, a twisting of the spur gears is possible in order to set the desired pretension of the torsion spring.

It may however be favorable to arrange the cams completely overlap-free in the axial direction. This means that the two spur gears can be twisted in both directions of rotation in order to set the desired pretension of the torsion spring.

For mounting purposes, the two spur gears may be brought to a rotational position in which the two cams are arranged behind each other, e.g., without a peripheral offset to each other. In this position, the cams take up the smallest possible space in the peripheral direction; in this rotational position, the torsion spring may be arranged stress-free, wherein both cams engage in the slot of the torsion spring.

The cams preferably each have a peripheral extension which is the same size as or smaller than the peripheral extension of the slot of the torsion spring. In this way, the torsion spring can be mounted between the two spur gears without spring deflections.

A perfect alignment of the torsion spring may be achieved if, on their mutually facing end faces, the spur gears have bearing faces for axial mounting of the torsion spring. An axial extension of each cam, between the bearing face of the assigned spur gear and the free cam end of this cam, is smaller than the axial extension of the torsion spring. The two cams jointly have an axial extension, between the bearing faces of the spur gear and the free cam ends, which is smaller than the axial extension of the torsion spring. If the torsion spring is arranged axially play-free between the two spur gears, an axial spacing may be formed between the two cams, i.e. the cams do not touch each other.

The torsion spring may have an approximately rectangular cross-sectional profile which is arranged in arcuate fashion about a rotation axis of the gear, wherein the torsion spring may be formed flat.

In one embodiment, the two spur gears may be arranged on a common bearing bolt, wherein at least one of the two spur gears is arranged rotatably on the bearing bolt. The two spur gears may be identical in structure; the two spur gears may be arranged freely rotatably on the bearing bolt. The cams may each be connected integrally with an assigned spur gear.

A further measure for improving the stiffness may be that contact faces for the cams, formed on the two spring ends, are arranged on the radially outer end of the spring ends, wherein the contact faces are delimited radially inwardly by clearances at the spring ends. The further radially out the force application point lies, the stiffer the spring behaves, because of the lever ratios. The clearances ensure defined force application points radially on the outside.

The contact faces and the clearance faces forming the clearances may be arranged at an angle to each other, wherein an extension of the contact face in the radial direction lies in a region which amounts to at least 80% and most 100% of an external diameter of the torsion spring formed as a circular ring segment.

The load-free torsion spring with the respective contact face may span a flat face in which the rotation axis of the gear also lies. In this case, an optimal force transmission in the circumferential direction can be ensured.

Also, at their peripheral ends, the cams with the respective flat cam faces may each span a plane in which the rotation axis of the gear lies.

The wall thickness of the torsion spring in the radial direction may have a great influence on its stiffness. For this reason, it is favorable to make optimal use of the installation space available.

The torsion spring may therefore have an outer diameter which is the same size as or greater than the root circle diameter of the gear. An optimally dimensioned torsion spring may have an outer diameter which extends approximately up to the tip circle diameter of a mating gear meshing with the gear. In this case, structurally a maximum stiffness is achieved for a given inner diameter and given axial thickness of the torsion spring. The inner diameter may extend approximately up to the outer diameter of the bearing bolt on which the two spur gears are arranged.

The pretension force of the torsion spring may be dimensioned sufficiently large to keep the influence of an impulse under a load direction change in the gear mechanism as small as possible. Under a load change, firstly a slight relative twist of the two spur gears takes place until the one tooth flank of the one spur gear—which was exposed before the load change—comes into contact with the assigned tooth of the engaging mating gear. Further force transmission now takes place evenly over the two spur gears. According to the disclosure, with an adequately large pretension force, said contact produces only a negligible noise.

The disclosed gear is particularly suitable for use in planetary gear mechanisms of a roll stabilizer. Roll stabilizers for motor vehicles stabilize the vehicle superstructure on cornering and reduce its rolling.

Such roll stabilizers for multitrack motor vehicles may be configured as active stabilizers and equipped with a divided torsion bar, between the mutually facing ends of which an actuator is arranged for transmission of a torsion moment. The actuator may have a housing which is connected to the one torsion bar part and houses a motor and a planetary gear mechanism connected to the motor, the gear output of which is connected to the other torsion bar part, wherein planet wheels of the planetary gear mechanism intermesh with a ring gear connected rotationally fixedly to the housing.

In such active roll stabilizers, disruptive rattling noises may be observed in operation, which are transmitted as body-borne sound to the passenger compartment. The disclosure solves the problem of disruptive rattling noises by the use of gears according to the disclosure as planet wheels in the planetary gear mechanism of the actuator. The gears according to the disclosure may stand in play-free engagement with the ring gear and with the sun wheel; it may be advantageous to form all planet wheels as gears according to the disclosure. Depending on application however, it may be sufficient if just one or some of the planet wheels are formed as gears according to the disclosure. If the planetary gear mechanism has several planetary gear stages, it may be sufficient to equip just one stage with the gears according to the disclosure. It may however be necessary in some cases to equip all planet wheels of all planetary gear stages with the gears according to the disclosure.

BRIEF DESCRIPTION OF THE DRAWINGS

The disclosure is now explained in more detail with reference to embodiments described in a total of 13 figures. In the figures:

FIG. 1 shows an active roll stabilizer,

FIG. 2 shows a planetary gear stage of the active roll stabilizer from FIG. 1, FIG. 3 shows a cross section through the planetary gear stage of FIG. 2.

DETAILED DESCRIPTION

Figure 4:
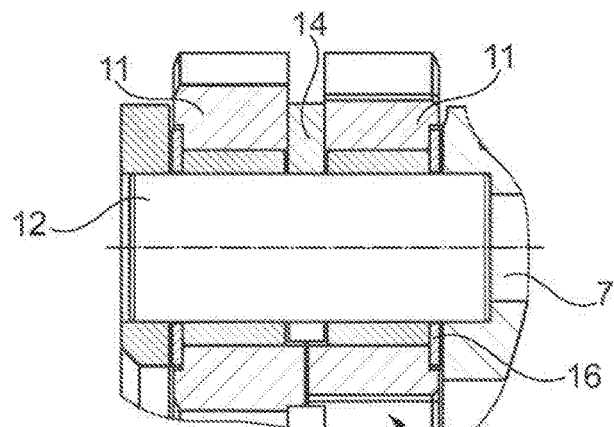
FIG. 4 shows a partial longitudinal section through the planetary gear stage of FIG. 2.

FIG. 1 shows an active roll stabilizer for a multitrack motor vehicle which has a torsion bar 3 divided into two torsion bar parts 1, 2, and an actuator 4 actively arranged between the two torsion bar parts 1, 2. This active roll stabilizer is arranged transversely to the vehicle longitudinal axis; its free ends are connected to wheel carriers (not shown). The actuator 4 has a hollow cylindrical housing 5 which houses an electric drive (not shown) and a planetary gear mechanism connected to the drive and not shown in detail. The housing 5 is connected rotationally fixedly to the torsion bar part 2. An output shaft (not shown) of the planetary gear mechanism is connected rotationally fixedly to the torsion bar part 1. When the actuator is activated, the two torsion bar parts 1, 2 are twisted relative to each other and a torsion moment is built up.

FIG. 2 shows a planetary gear stage 6 of said planetary gear mechanism. A planet wheel carrier 7 carries four gear wheels 8 which are distributed over the periphery and will be described in more detail below, and which are here used as planet wheels 9. The further description of the gear wheels 8 according to the disclosure is given with reference to these planet wheels 9.

FIG. 3 shows in cross section the planetary gear stage 6 fitted in the housing 5. The planet wheels 9 with teeth 23 intermesh with teeth 24 of a mating gear 26, which is here formed as a ring gear 10 of the planetary gear mechanism and connected rotationally fixedly to the housing 5.

FIG. 4 shows a planet wheel 9 in longitudinal section. The planet wheel 9 has two axially adjacent spur gears 11 which, in the exemplary embodiment shown, are identical in structure. The two spur gears 11 are arranged rotatably on a bearing bolt 12 which is attached to the planet wheel carrier 7. The gear may be asymmetric, so that one half is configured narrower. The cams may themselves also be asymmetric in both the peripheral direction and in their axial installation length.

Figure 5:
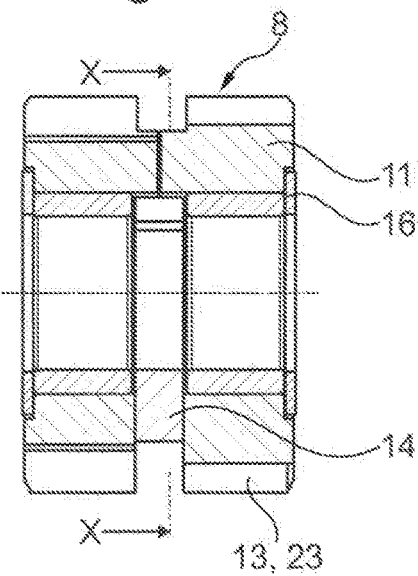
FIG. 5 shows a gear according to the disclosure as a planet wheel as depicted in FIG. 4.

FIG. 5 shows the planet wheel 8 with its individual parts. On their outer periphery, the spur gears 11 have teeth 13 for engagement with the ring gear and with the sun wheel. A torsion spring 14 in the form of a circular ring segment is arranged between the two spur gears 11 and will be described in more detail below. The two spur gears 11 are provided with plain bearing bushes 15 for rotatable mounting on the bearing bolt. A thrust washer 16 is attached to each of the end faces of the spur gears 11 facing away from each other. Two axially adjacent teeth 13 of the two spur gears 11 together form one of the teeth 23 of the planet wheel 9.

The thrust washers in the gears according to the disclosure may be omitted depending on application.

It can also be seen from FIG. 5 that the torsion spring 14 has an inner diameter which extends to the outer periphery of the bearing bolt (not shown here). The outer diameter of the torsion spring extends almost up to the tip circle diameter of the ring gear but does not collide with the teeth of the ring gear.

Figure 6:
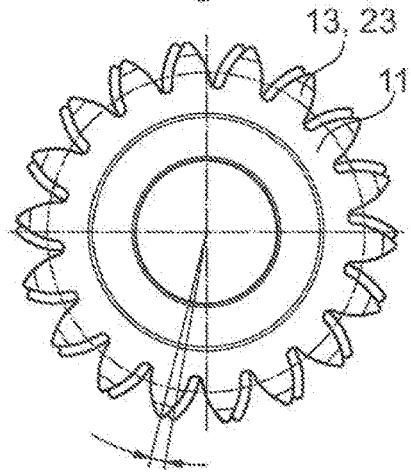
FIG. 6 shows a front view of the gear from FIG. 5.

FIG. 6 shows the two spur gears 11 in a rotational position with the teeth 13 arranged offset. An initial twist φi between the two spur gears 11 is clearly evident. In the rotational position depicted, no pretension has yet been applied to the torsion spring 14; when the two spur gears 11 rotate further in the direction towards a rotational position in which the teeth 13 of the two spur gears 11 align, there is however an increase in a torque as the load of the torsion spring increases, up to a maximum moment Tmax with the teeth 13 axially aligned.

Figure 7:
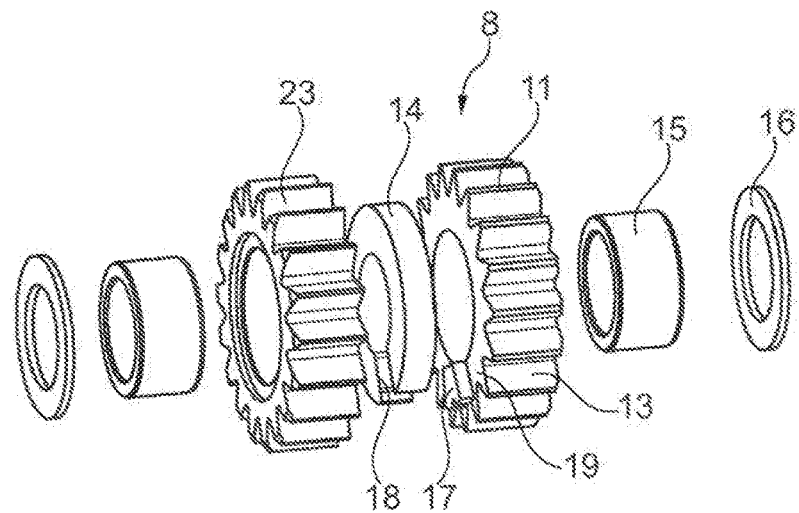
FIG. 7 shows the gear from FIG. 5 in an exploded view.

FIG. 7 clearly shows the individual parts of the planet wheel 9. Here it is evident that the spur gears 11 on the two mutually facing ends are each provided with an axially protruding cam 17 which is connected integrally to the assigned spur gear 11. The figure clearly shows the torsion spring 14, between the two peripherally mutually opposing ends of which a slot 18 is formed in which the two cams 17 engage. The mutually facing ends of the two spur gears have bearing faces 19 for axial mounting of the torsion spring 14.

Figure 8:
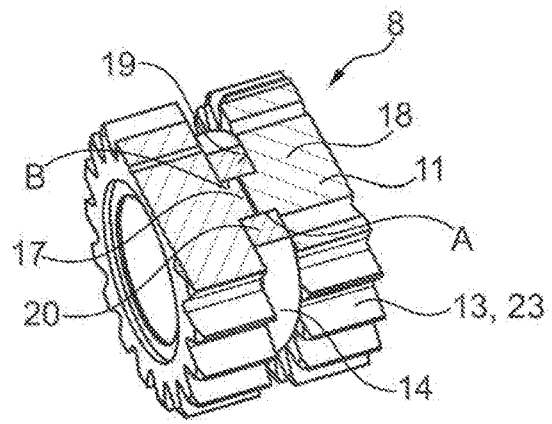
FIG. 8 shows a perspective view of the gear from FIG. 5 in cross section.
Figure 9:
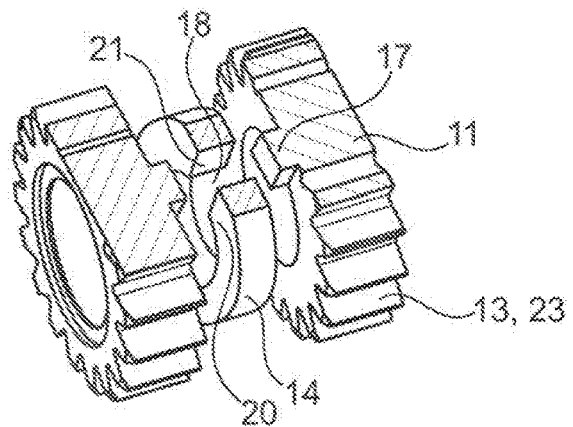
FIG. 9 shows an exploded view of the gear as in FIG. 8.

FIGS. 8 and 9 clearly show the engagement of the cams 17 in the slot 18 of the torsion spring 14. FIG. 8 in particular clearly shows that the two cams 17, between the bearing face 19 of the assigned spur gear 11 and the free cam end of this cam 17, jointly have an axial extension which is smaller than the axial extension of the torsion spring 14. If the torsion spring 14 is arranged axially play-free between the two spur gears 11, an axial distance is formed between the two cams 17, i.e. the cams 17 do not touch.

FIG. 9 clearly shows that the torsion spring 14 has an approximately rectangular cross-sectional profile which is arranged in arcuate fashion around the rotation axis of the planet wheel 9, wherein the torsion spring 14 is formed flat. The spring ends 20 of the torsion spring 14 have mutually facing contact faces 21 for the cams 17. The axial extension of these contact faces 21 corresponds to the axial thickness of the torsion spring 14.

Both contact faces 21 each overlap both cams 17 in the axial direction. The two cams 17 are arranged substantially axially aligned for mounting of the torsion spring 14. Depending on the design of the cams, a pretension of the torsion spring 14 can be set in both directions of rotation. The extension of the two cams 17 in the peripheral direction is slightly smaller than the extension of the slot 18 of the unloaded torsion spring 14. Consequently, assembly of the planet wheel 9 is simple. The peripheral play of the two cams 17 in the slot is dimensioned such that the spur gears 11 can twist relative to each other by an angle which is smaller than half the pitch of the spur gear.

In FIG. 8, the designations "A" and "B" indicate the contacts which exist between the torsion spring 14 and the two cams 17 when the torsion spring 14 is pretensioned. The two contact faces 21 formed at the spring ends 20 are loaded diagonally; in position "A", the one cam 17 is in contact, and in position "B", the other cam 17.

Figure 10:
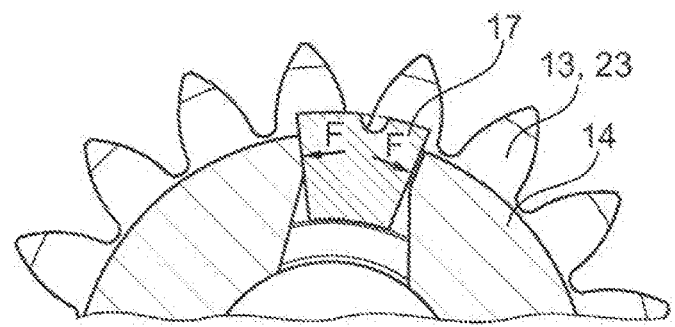
FIG. 10 shows a section along line X-X from FIG. 5.

FIG. 10 shows a section through the planet wheel 9. This depiction shows that the force transmission "F" between the cams 17 and the torsion spring 14 takes place on the radially outer portion of the torsion spring 14. The further radially outward the force transmission "F" takes place, the stiffer the torsion spring 14 behaves and the more favorable the influence of the torsion spring 14 on reducing the disruptive rattling noise on a load change. Since the torsion spring 14 in deformed state is no longer perfectly circular, the contact point will drift radially outward, which benefits the stiffness of the torsion spring.

Figure 11:
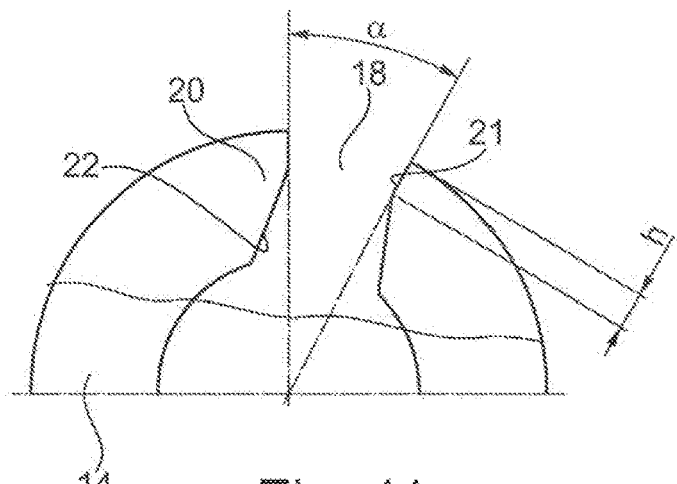
FIG. 11 shows a torsion spring of the gear from FIG. 5.

FIG. 11 shows the opening angle alpha between the two contact faces 21 of the torsion spring 14. The contact faces 21 enclosing the opening angle alpha evidently lie in a plane which contains the rotation axis of the gear 8. In this position of the contact faces 21, the maximum possible force can be transmitted in the peripheral direction with a minimum possible radial force component.

The contact faces 21 extend over a height h which extends radially in a region as far radially out as possible at the spring end 20. In the exemplary embodiment, this region lies in a portion which amounts to between 80% and 100% of the outer diameter of the torsion spring 14. The further the attack point of the force is spaced radially from the rotation axis of the planet wheel 9, the better the torsion spring 14 can transmit the torque.

Figure 12:
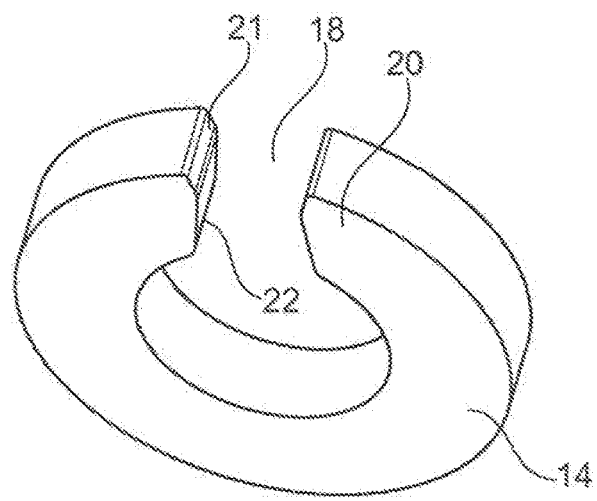
FIG. 12 shows the torsion spring from FIG. 11 in perspective view.

FIG. 12 shows the torsion spring in perspective view.

Figure 13:
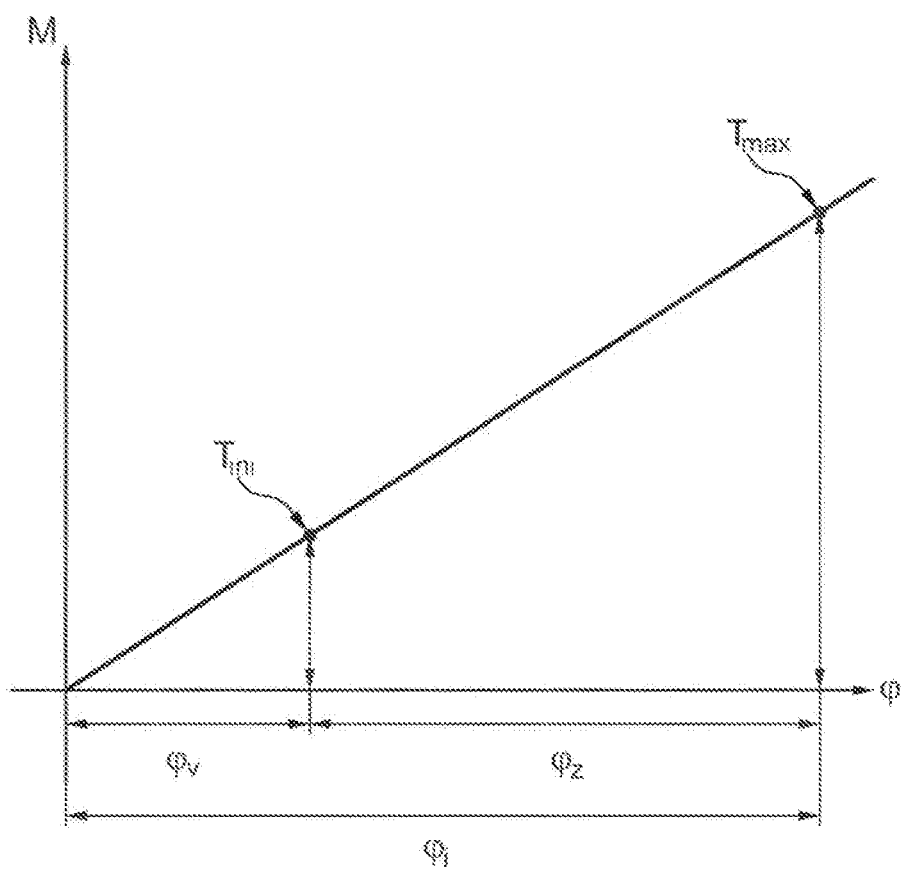
FIG. 13 shows a diagram with the pretension moment of the gear over the twist angle.

For the installation and function of the gear according to the disclosure as a planet wheel in the planetary gear mechanism, reference is made to FIG. 13 which shows a moment loading "M" of the torsion spring 14 over the twist angle "φ" between the two spur gears 11.

The initial twist φi of the two spur gears 11 (FIG. 6) represents the twist angle before these are joined to the ring gear and sun wheel. When the planet wheels 9 are joined to the sun wheel and ring gear using the planet carrier 7, the spur gears 11 are twisted relative to each other, since the initial twist φi is greater than the toothing play φz available between the planet wheel and the ring gear/sun wheel. The spur gears 11 are now twisted relative to each other by the pretension angle φv. A pretension moment Tini is set. The gear mechanism is now play-free. The travel still available is the toothing play φz. If the gear mechanism is now subjected to a moment, the spur gears twist further relative to each other until the tooth flanks make contact. During this process, the torsion spring is loaded to the maximum moment Tmax. This energy is now stored in the spring and reduces the impulse with which the tooth flanks can impact on each other. This effect is achieved by targeted matching of the spring stiffness and spring travel. The spring travel can be set using the toothing play.

The teeth 23 of the planet wheels 9 engage in the tooth gaps 25 of the ring gear 10 (FIG. 3). When the planetary gear mechanism is unloaded, firstly the one tooth 13 of the one spur gear 11 lies with pretension on the tooth 24 of the ring gear 10 delimiting the tooth gap 25; secondly, the other tooth 13 of the other spur gear 11 lies on the other tooth 24 of the ring gear 10 delimiting the tooth gap 25. If an operating load is now applied, the two spur gears 11 twist, with an increase in the torque acting between the two spur gears 11, until their teeth 13 are axially aligned and both lie with pretension on a common tooth 24 of the ring gear 10.

Similarly, the planet wheels 9 engage in the tooth gaps of the sun wheel so that play-free engagement of the planet wheels with the sun wheel is guaranteed.

LIST OF REFERENCE SIGNS

1 Torsion rod part
2 Torsion rod part
3 Torsion rod
4 Actuator
5 Housing
6 Planetary gear stage
7 Planet wheel carrier
8 Gear wheel
9 Planet wheel
10 Ring gear
11 Spur gear
12 Bearing bolt
13 Teeth
14 Torsion spring
15 Plain bearing bush
16 Thrust washer
17 Cam
18 Slot
19 Bearing face
20 Spring end
21 Contact face
22 Clearance
23 Tooth (planet wheel)
24 Tooth (ring gear)
25 Tooth gap (ring gear)
26 Mating gear

The invention claimed is:

1. A gear for a gear train, said gear being divided into two axially adjacent spur gears and having a torsion spring in the form of a circular ring segment, wherein between two peripherally mutually opposing spring ends, a slot is formed in which two cams engage which are each assigned to one of the two spur gears, wherein one of the cams is assigned to one of the two spring ends and the other cam is assigned to the other spring end, wherein the two cams are axially aligned, wherein contact faces for the cams formed at both spring ends of the torsion spring are arranged on a radially outer end of the spring ends, wherein the contact faces are delimited radially inwardly by clearances on the spring ends.

2. The gear as claimed in claim 1, wherein the cams each have a peripheral extension which is a same size as or smaller than a peripheral extension of the slot of the torsion spring.

3. The gear as claimed in claim 1, wherein on mutually facing end faces, the spur gears have bearing faces for axial mounting of the torsion spring, wherein an axial extension of each cam, between the bearing face of the assigned spur gear and a free cam end of this cam, is smaller than an axial extension of the torsion spring.

4. The gear as claimed in claim 3, wherein the two cams jointly have an axial extension, between the bearing faces of the spur gears and the free cam end, which is smaller than the axial extension of the torsion spring.

5. The gear as claimed in claim 1, wherein the torsion spring has an approximately rectangular cross-sectional profile which is arranged in arcuate fashion about a rotation axis of the gear, wherein the torsion spring is formed flat.

6. The gear as claimed in claim 1, wherein the two spur gears are arranged on a common bearing bolt, wherein at least one of the two spur gears is arranged rotatably on the bearing bolt.

7. The gear as claimed in claim 1, wherein the two spur gears are identical in structure, wherein the two cams are each connected integrally with the assigned respective spur gear.

8. The gear as claimed in claim 1, wherein the contact face in a radial direction lies inside a region which amounts to at least 80% and most 100% of an outer diameter of the torsion spring in the form of a circular ring segment.

9. The gear as claimed in claim 8, wherein the torsion spring with its contact faces spans a respective flat surface in which a rotation axis of the gear lies.

10. The gear as claimed in claim 1, wherein the torsion spring has an external diameter which is a same size as or greater than a root circle diameter of the gear.

11. The gear as claimed in claim 10, wherein the torsion spring has an outer diameter which extends approximately up to a tip circle diameter of a mating gear meshing with the gear.

12. The gear as claimed in claim 6, wherein the torsion spring has an inner diameter which extends approximately up to an outer diameter of the bearing bolt.

13. The gear as claimed in claim 9, wherein at their peripheral ends with their cam faces, the two cams span a respective plane in which the rotation axis of the gear lies.

14. A roll stabilizer for a multitrack motor vehicle, with a divided torsion bar, between mutually facing ends of which an actuator is arranged for transmission of a torsion moment, wherein the actuator has a housing which is connected to one torsion bar part and houses a motor and a planetary gear mechanism connected to the motor, a gear output of which is connected to the other torsion bar part wherein planet wheels of a planetary gear mechanism intermesh with a ring gear connected rotationally fixedly to the housing, wherein at least one of the planet wheels is formed by a gear as claimed in claim 1 and is in play-free engagement with the ring gear.

15. A gear for a gear train, said gear being divided into two axially adjacent spur gears and having a torsion spring in the form of a circular ring segment, wherein between two peripherally mutually opposing spring ends, a slot is formed in which two cams engage which are each assigned to one of the two spur gears, wherein one of the cams is assigned to one of the two spring ends and the other cam is assigned to the other spring end, wherein contact faces for the cams formed at both spring ends of the torsion spring are arranged on a radially outer end of the spring ends, wherein the contact faces are delimited radially inwardly by clearances on the spring ends, wherein on mutually facing end faces, the spur gears have bearing faces for axial mounting of the torsion spring, wherein an axial extension of each cam, between the bearing face of the assigned spur gear and a free cam end of this cam, is smaller than an axial extension of the torsion spring.

16. The gear as claimed in claim 15, wherein the two cams jointly have an axial extension, between the bearing faces of the spur gears and the free cam end, which is smaller than the axial extension of the torsion spring.

* * * * *